US009659022B2

(12) United States Patent
Antic et al.

(10) Patent No.: US 9,659,022 B2
(45) Date of Patent: May 23, 2017

(54) FILE OBJECT BROWSING AND SEARCHING ACROSS DIFFERENT DOMAINS

(75) Inventors: Stevan Antic, Boca Raton, FL (US); Robert E. Loredo, North Miami Beach, FL (US); Adrian X. Rodriguez, Durham, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 410 days.

(21) Appl. No.: 13/196,265

(22) Filed: Aug. 2, 2011

(65) Prior Publication Data

US 2013/0036131 A1  Feb. 7, 2013

(51) Int. Cl.
*G06F 17/30* (2006.01)

(52) U.S. Cl.
CPC .............................. *G06F 17/30106* (2013.01)

(58) Field of Classification Search
CPC .................................................. G06F 17/30106
USPC .................................................. 707/737, 749
See application file for complete search history.

(56) References Cited

U.S. PATENT DOCUMENTS

| 6,453,312 | B1 | 9/2002 | Goiffon et al. |
| 7,272,597 | B2 | 9/2007 | Chowdhury et al. |
| 7,831,601 | B2 * | 11/2010 | Oral et al. ..................... 707/741 |
| 2003/0149690 | A1 | 8/2003 | Kudlacik et al. |
| 2003/0187834 | A1 * | 10/2003 | Oda et al. .......................... 707/3 |
| 2006/0195475 | A1 * | 8/2006 | Logan et al. .............. 707/104.1 |
| 2006/0218111 | A1 * | 9/2006 | Cohen .............................. 706/45 |
| 2006/0248059 | A1 * | 11/2006 | Chi et al. .......................... 707/3 |
| 2008/0177731 | A1 | 7/2008 | Matsuzaki |
| 2008/0208645 | A1 | 8/2008 | Molloy |
| 2009/0106674 | A1 | 4/2009 | Bray et al. |
| 2010/0030769 | A1 * | 2/2010 | Cao et al. .......................... 707/5 |
| 2010/0131523 | A1 * | 5/2010 | Yu et al. ....................... 707/756 |

(Continued)

FOREIGN PATENT DOCUMENTS

WO    WO2007081666    *  7/2007

OTHER PUBLICATIONS

Arastoopoor, S.; "Search Tools Through The Glass: A Story of Clustering Search Results . . . with A Glance on the Web", ICADIWT Inter. Conf. on, Aug. 4-6, 2009,pp. 823-825.

(Continued)

*Primary Examiner* — Alexey Shmatov
*Assistant Examiner* — Kurt Mueller
(74) *Attorney, Agent, or Firm* — Joe Polimeni; Edell, Shapiro & Finnan, LLC

(57) ABSTRACT

A desired object stored on a computer system is retrieved by retrieving one or more objects based on an object attribute to produce initial search results, selecting an object from the initial search results, where the selected object is associated with one or more other attributes, and retrieving one or more additional objects based on one or more of the other attributes of the selected object to expand the initial search results and provide the desired object. The objects are linked to one or more tree structures each associated with an object attribute, such that the retrieving one or more additional objects includes traversing the tree structures linked to the selected object and associated with the one or more other attributes to identify the one or more additional objects.

18 Claims, 6 Drawing Sheets

(56) References Cited

U.S. PATENT DOCUMENTS

| 2010/0223275 | A1 | 9/2010 | Foulger et al. | |
|---|---|---|---|---|
| 2010/0250586 | A1 | 9/2010 | Hall et al. | |
| 2010/0318561 | A1 | 12/2010 | Dunie et al. | |
| 2010/0332466 | A1 | 12/2010 | White et al. | |
| 2011/0128290 | A1* | 6/2011 | Howell et al. | 345/440 |
| 2012/0254798 | A1* | 10/2012 | Bickel et al. | 715/817 |
| 2013/0246938 | A1* | 9/2013 | Stata et al. | 715/752 |

OTHER PUBLICATIONS

Zhang et al.; "Study on Domain-Specific Search Engine and Its Automated Generation", International Conference on, Jul. 12-15, 2008, pp. 1637-1642.

Yamada et al.; "Cross-Domain Object Matching with Model Selection", Tokyo Institute of Technology, Dec. 17, 2010.

IBM et al.; "A Method for Displaying, Searching, and Referencing Software Object Types Using Domain Specific Terminology", IPCOM000180600D, Mar. 12, 2009.

Drozkek, "Data Structures and Algorithms in C++" Second Addition, 2001, Brooks/Cole, Pacific Grove, CA (169 pages).

Heger, "A Disquisition on the Performance Behaviour of Binary Search Tree Data Structures", Upgrade, vol. 5, No. 5, Oct. 2004, (pp. 67-75).

Ginsberg, et al., "Interactive Broadening", Computer Science Department, Stanford University, Stanford, CA, (16 pages).

Tulder, "Storing Hierarchical Data in a Database Article", May 4, 2011, (5 pages).

Knuth, "The Art of Computer Programming", vol. 3, Sorting and Searching, Second Addition, 1998, Addison-Wesley, (309 pages).

\* cited by examiner

FILE OBJECT BROWSING AND SEARCHING ACROSS DIFFERENT DOMAINS

BACKGROUND

1. Technical Field

Embodiments of the invention relate to searching within a file system to obtain search results, and initiating subsequent searches based upon the search results.

2. Discussion of the Related Art

Searching a file system can be a tedious task. For example, in order to perform a search for a file, one often needs to have exact information associated with that file. Many current file system search technologies begin with a seed value, and searching occurs across a search domain to find search results associated with the seed value. A user can filter results until a match is found. Once a match is found, typically utilizing a narrowing search method, the search is complete. If a match is not found, the user must initiate a new search (e.g., utilizing a different seed value).

In addition, many traditional computer system based searches are linear and therefore limited to one domain (such as time, file name, type, etc.). This can result in time consuming searches, particularly when there are many files saved in a file system that is searched. While filters can be applied to narrow the search results, the filter criteria are often the same as the search domain. In other search systems, files can be indexed and the index can then be used to search for a particular file. However, the index must be maintained (e.g., continuously updated) for index based file systems.

BRIEF SUMMARY

In an example embodiment of the present invention, a search for a desired object stored on a computer system comprises retrieving one or more objects based on an object attribute to produce initial search results. An object is selected from the initial search results, where the selected object is associated with one or more other attributes, and one or more additional objects are retrieved based on one or more of the other attributes of the selected object to expand the initial search results and provide the desired object. The objects are linked to one or more tree structures each associated with an object attribute, such that the retrieving one or more additional objects includes traversing the tree structures linked to the selected object and associated with the one or more other attributes to identify the one or more additional objects.

The above and still further features and advantages of embodiments of the present invention will become apparent upon consideration of the following detailed description thereof, particularly when taken in conjunction with the accompanying drawings wherein like reference numerals in the various figures are utilized to designate like components.

DETAILED DESCRIPTION

Figure 1:
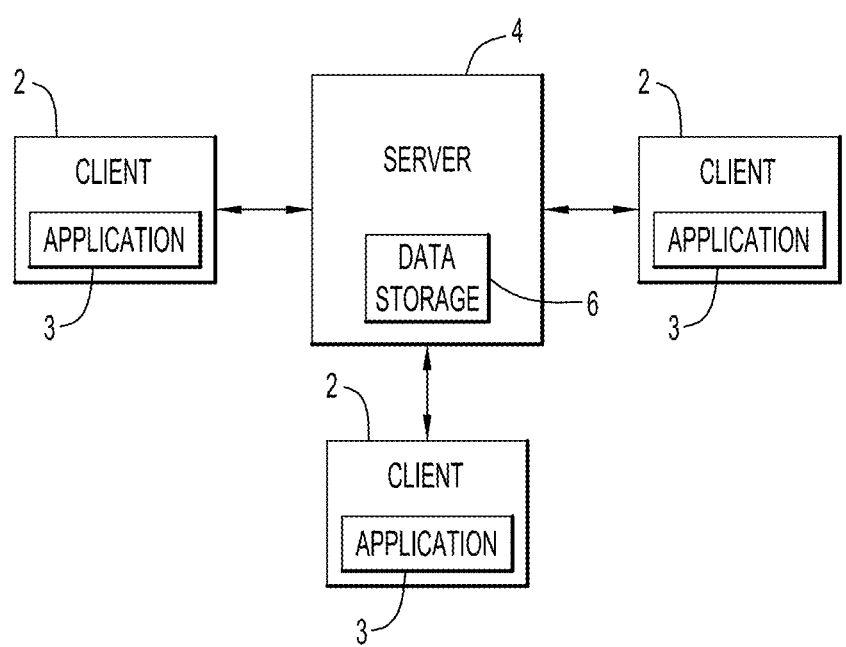
FIG. 1 is a diagrammatic illustration of an example embodiment of a computer system that performs a search of a data source for one or more objects based upon search criteria in accordance with the present invention.

Present invention embodiments provide systems, computer program products and methods for searching within a file system, where an initial search is conducted in one search domain and one or more subsequent searches in other search domains can be conducted based upon the results of previous searches. An initial search returns results or file objects. The associated properties or attributes of one or more file objects can then be used to broaden or expand one or more subsequent searches. In particular, a search can be initiated based upon previous search results by traversing interconnected concept trees that link two or more files. The subsequent searches may or may not have the same criteria and search domain. A subsequent search may broaden the search results to include data that was not available after any previous search. A concept tree based search mechanism provides an intuitive way to find the object of interest by seeding the search with an object that is already available, and then browsing associated concept trees that link the seed object file with the searched object file.

The present invention embodiments are designed to resemble a human thinking search process, where the human mind thinks and traverses from one object to other objects based upon related attributes of the objects. An initial search result provides a seed value from which the search thread can be followed and linked to other search threads. In one example, a search thread could begin with a word document filename search, which yields results. Utilizing the initial search results, the search can be narrowed by the creation date and then broadened (by traversing to other objects) to include all files created by the same author on that date. This search provides an indication or a "picture" of all files created by the same author on the same date that the author created the word document uncovered from the initial search.

The human mind can be considered a type of information processing system that relates memories through the thought process. For example, the smell of a perfume can lead one to remember a person that wears such a perfume. The remembered person has an associated set of attributes, where each attribute leads to another remembered object (e.g., other persons associated with the remembered person), and that object has its own associated properties that lead to yet another remembered object, and so on. The thought process follows the links that connect a remembered object with other objects via its associated properties or attributes, and at a moment when one becomes aware of another linked object, the mind associates the two objects as being related (e.g., a perfume smell is linked to a remembered person).

Links between remembered objects can be analogous to hierarchical or concept tree structures (e.g., a time tree structure, a location tree structure, a folder tree structure, etc.). This enables the same type of objects to be considered in the context of different concept trees. In the previously described perfume example, consider the thought process in which the small of perfume leads to a remembered person who wore such perfume at an event some time ago (e.g., 10 years in the past), which then leads to the thought process linking to another remembered person at the event or at about the same time period. The thought process can further search memories for all remembered persons associated with the smelled perfume or by perfume types, remembered persons met during the same particular time period, etc. Such thought processing switches between different concept tree structures (e.g., persons associated with perfume types, persons met at the same event and/or at a particular period of time during one's life, etc.) can all occur from the initial processing of the smell of a perfume. The present invention embodiments apply a switching mechanism between hierarchical concept tree structures in a manner analogous to the human thinking process in order to efficiently and effectively search a file system for documents that may be relevant to a particular search request.

An example embodiment of a system that implements file object browsing and searching across different domains is now described with reference to FIG. 1. The system includes a plurality of clients 2 that access a server 4. While only three clients 2 are shown in FIG. 1, it is noted that the system can be configured to facilitate communication between any selected number of clients 2 and the server 4. The server 4 includes a data storage module 6 that stores data files for retrieval by the clients. The data files can be of any suitable types including, without limitation, text files (e.g., word processing documents, data spreadsheet files, emails, etc.), video or other graphical image files (e.g., JPEG and/or MPEG files), and/or any combinations of such files. Each data file includes attributes associated with the data file, such as metadata (e.g., information about date of creation or last update of the data file, author of data file, file size, file type, file name, etc.). For graphical image files, such as JPEG and MPEG files, such files can be tagged with identification of subjects within the image(s), where attributes associated with these files include the identification of the one or more subjects within such files.

Each client 2 includes one or more applications 3 that process such data files for use by the client. Examples of different types of applications include, without limitation, word processing applications, spreadsheet applications, client based email applications, other client based applications for processing data (e.g., Lotus Notes application), website, web history and other internet applications, etc.

The clients 2 and server 4 may be local or remote from each other and communicate (as indicated by the arrows between each client 2 and the server 4 as shown in FIG. 1) via a direct connection or any suitable network. For example, a network can be implemented to facilitate transfer of any types of data and/or other information between any client 2 and the server 4 utilizing any suitable communications media (e.g., wide area network (WAN), local area network (LAN), Internet, Intranet, etc.). In addition, any one or more of the clients 2 can be integrated with the server 4 as sub-components within a single system.

Each of the clients 2 and the server 4 including data storage module 6 may be implemented by any conventional or other computer systems which can be equipped with a display or monitor to provide a graphical user or other interface to solicit information from users pertaining to desired data file searches, a base (e.g., including the processor, memories and/or internal or external communications devices (e.g., modem, network cards, etc.)), optional input devices (e.g., a keyboard, mouse or other input device), and any commercially available and/or custom software (e.g., server/communications software, analysis and/or other types of modules, browser/interface software, etc.) that facilitates operation of each client 2 and the server 4 to perform searches and obtain data files of interest from the data storage module 6.

An example embodiment of a search process across different search domains utilizing the system of FIG. 1 is now described with reference to the flow chart of FIG. 2. A search for data files is initiated of the data storage module 6 in the server 4 based upon a user query by a client 2 (step 100). The search is conducted based upon one or more attributes associated with data files stored within the module 6 of the system. As previously noted, the attributes can be meta data associated with data files and can include, without limitation, time information (e.g., date in which a data file was created or modified, date received, date sent, most recent date accessed, etc.), file type information (e.g., the file extension, such as DOC, XLS, PPT, HTM, PDF, TXT, JPEG, MPEG, TIFF, etc.), a name associated with the data file (e.g., file name, send name, recipients name, author's name, etc.), file location information (virtual or physical file location), etc.

The server 4 obtains search results including a collection of data files from the data storage module 6 (step 110). Any suitable search algorithm or process may be used by the server 4 to process the search query and obtain search results from the data storage module 6 that are relevant to the query. The initial search will set a seed value for the search process to obtain a first set of objects or data files. Subsequently, any search can be performed (automatically by the system or by user input) to broaden the search results so as to include other data files. Based on the results of the initial search or any subsequent search, any one or more objects or data files from such search results can be used as a starting point for further searching.

In an optional step, at any point after a search has been conducted, the search results can be narrowed by filtering the search results (step 120), in which any search domain attributes can be selected and applied to remove a subset of the results that do not match the criteria of the selected attributes.

In contrast to typical searches that narrow search results (e.g., via filtering as described in the previous step), the searching process facilitated by the present invention embodiments includes a broadening of the search query by changing the search domain (step 130) by switching to a different concept tree structure including an object or data file with an attribute that is the same or similar to the attribute of an object or data file within the previous search. The searching process facilitates traversal from one object in a particular search domain, which may be associated with a particular application type (e.g., a word processing application) to another object located within a separate search domain and which may be associated with a different application type (e.g., an email application). Each object from a search domain may be organized in one or more hierarchical or concept tree structures, where concept tree structures for different search domains can be associated based upon related attributes. Each concept tree structure can be generated dynamically during a search, where objects that are not directly related can be linked by association of different concept tree structures based upon related attributes of the tree structures.

The broadened search query provides subsequent search results (step 140), and a decision can be made whether to continue searching (step 150). If searching is to be continued, steps 120-140 can be repeated, otherwise, the process ends with the latest (most recent) search results.

Figure 2:
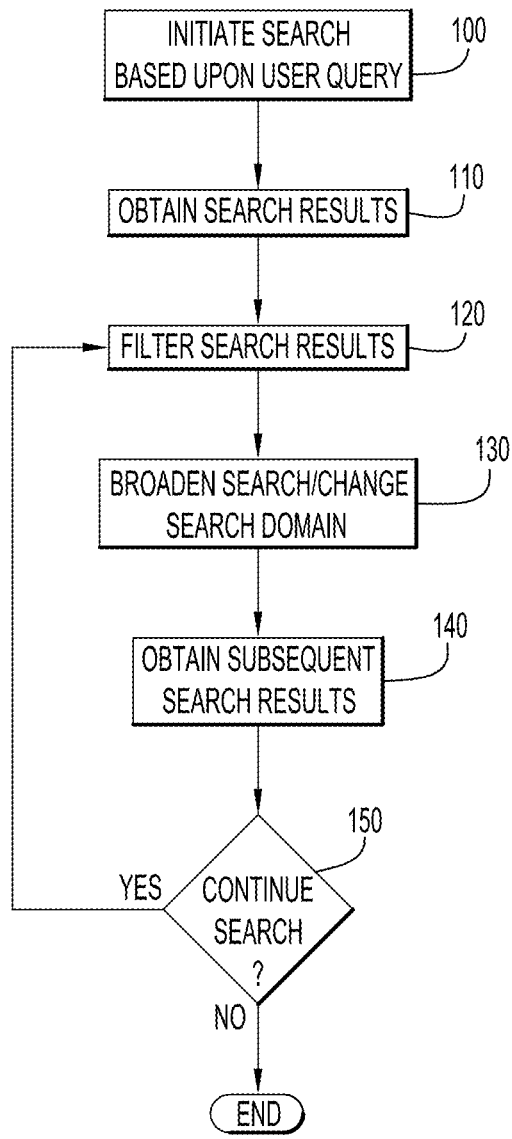
FIG. 2 is a flow diagram illustrating a method for searching for file objects within the system of FIG. 1 in accordance with an example embodiment of the present invention.

In an example embodiment utilizing the process of FIG. 2, a suitable web content management application (e.g., IBM Websphere Portal) can be configured to allow clients to initiate a search in a suitable search platform (e.g., IBM OmniFind) based on a particular search domain, such as the name of a data file of the type XLS. Assume the data file is a sales product presentation. The system would have access to all file types. Based on the results of the initial search, a new search can be initiated within the same domain (file name) in order to narrow the search results. Alternatively, one or more attributes of a data object from the search can be used as a seed value to initiate a subsequent search within a new domain, such as all emails received on the same date in which the sales product presentation was last modified. This could lead to additional information associated with the sales product presentation, such as an email from a sales team that outlines sales figures for the presentation and further identifies customers having an interest in products of the sales product presentation. In this example, the search process proceeds from one object, the sales product presentation, to another object that is not directly related (an email including information about an interested customer). The search could continue to further link objects associated with different search domains and being of different object types.

Figure 3:
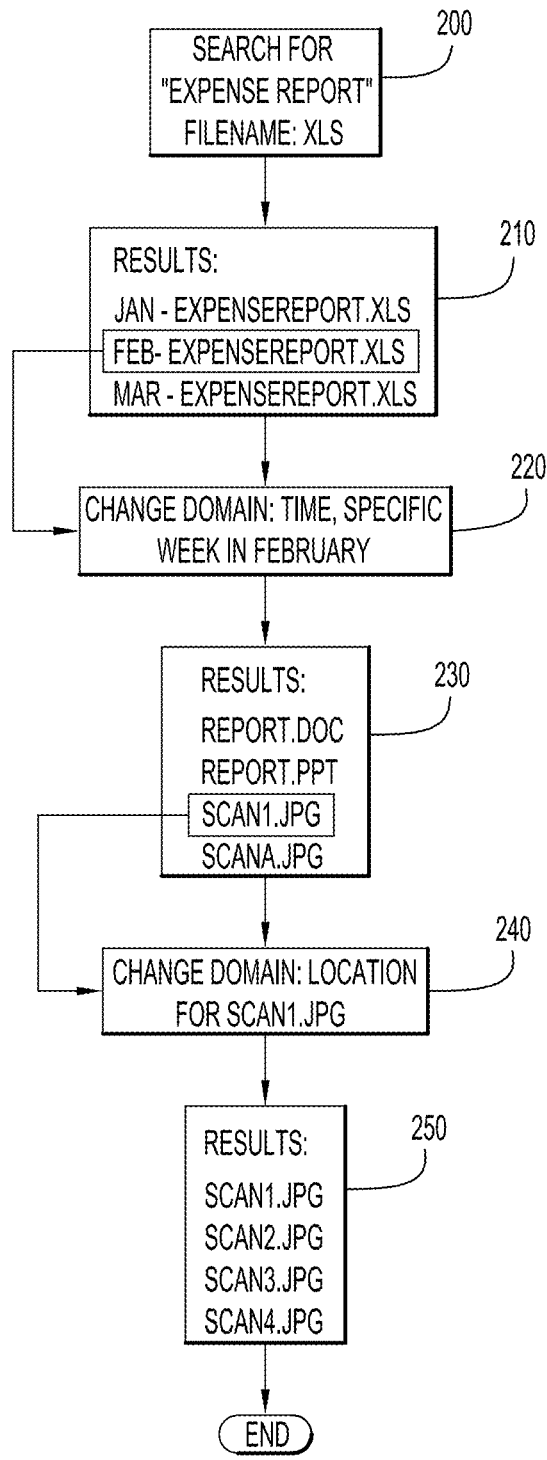
FIG. 3 is a flow diagram illustrating an example scenario in which data files associated with an expense report are obtained utilizing a search method as set forth in FIG. 2.

Another example embodiment is now described with reference to the flow chart of FIG. 3. A search is initiated for expense report data files, where the search domain may be by file name ("EXPENSE REPORT") and file type (e.g., XLS) (step 200). Assume in this scenario that the initial search obtains a series of expense report data files based upon certain time periods (e.g., "EXPENSE REPORT" files from January, February, March, etc.) (step 210). The search is broadened by changing the search domain to a time attribute (e.g., a specific week in the month of February) using the February expense report data file as the object for the basis of the subsequent search (step 220). The search domain is also broadened to include files of other types. The search results (step 230) include various data files associated with the February expense report data file that have a date attribute within the specified week. These files include DOC files, PPT files and JPEG files. In this scenario, the SCAN1.JPG file may be of interest, since it may be a sales receipt associated with the February expense report in the week of interest. A further broadening search can be conducted (step 240), in which the search domain is changed to a storage location in which SCAN1.JPG is located, where the search is for data files having the same or similar attributes as SCAN1.JPG at this storage location. The search results (step 250) generate a series of JPEG data files that are sales receipts associated with the expense report. Thus, the initial search allows a user to expand a search from related XLS expense report data files to other types of data files (e.g., scanned sales receipts) associated with a particular expense report.

Figure 4:
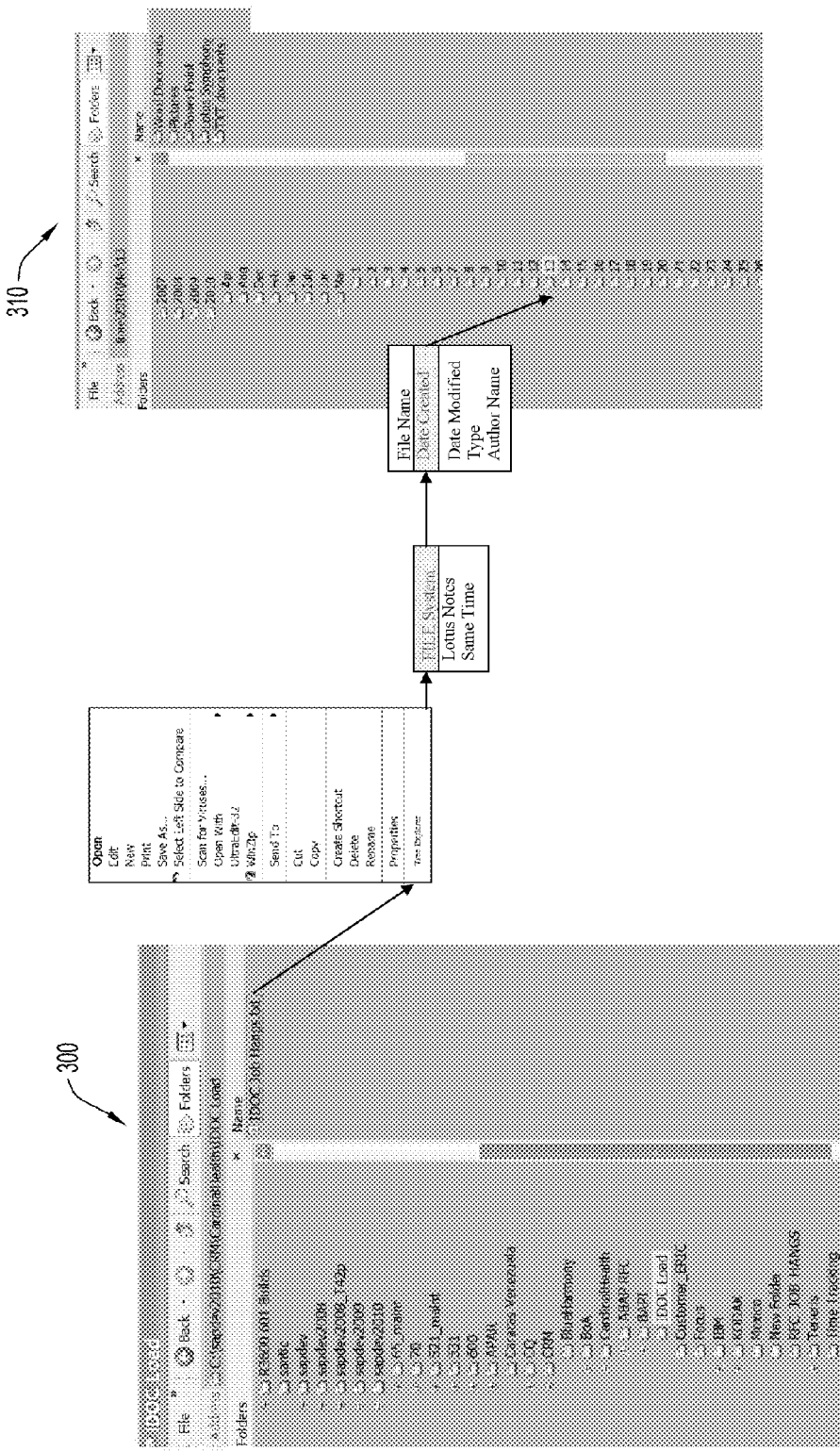
FIG. 4 depicts GUI images from an example embodiment in which a search based upon a file name within a database is broadened to obtain a series of data files within an application in accordance with the present invention.

Another example embodiment is depicted in FIG. 4, which shows two graphical user interfaces (GUIs). The first GUI 300 shows a file name (IDOC Job Hangs.TXT") in a database (e.g., within the client 2 or within the data storage module 6 of the server 4) that is used as the basis for a subsequent broadening search, in a manner similar to that previously described with reference to FIGS. 2 and 3. The second GUI 310 shows the ending search results provided within an application (e.g., Lotus Notes), where the search results might be a list of events grouped by a particular date (e.g., Mar. 13, 2010 as shown in the GUI 310). This example shows how a search that may start with one type of object in one application can be extended, by searching across a different domain, to another object in another application.

Figure 5:
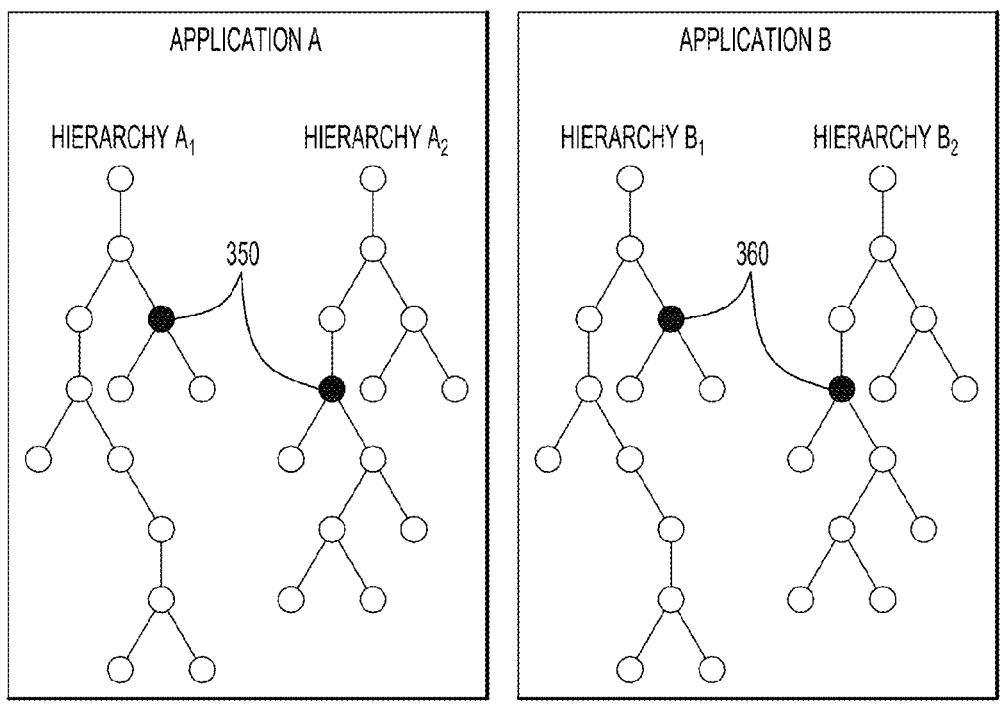
FIG. 5 depicts a conceptual view of concept trees comprising hierarchies in which objects may be placed differently within hierarchies depending upon the attributes associated with the hierarchies.

As previously noted, the search for objects or data files within an application is based upon attributes selected as criteria for the search (e.g., metadata such as filename, file type, file date, etc.). Hierarchical concept trees are developed dynamically during a search for each application. Depending upon the attributes selected for a particular search, an object can have different locations within a particular concept tree. This concept is depicted in FIG. 5, in which two applications A and B have different hierarchical concept trees depending upon the attributes associated with a particular concept tree. For example, an object 350 is shown at two different locations within hierarchies $A_1$ and $A_2$ for application A, while a similar object 360 is at two different locations within hierarchies $B_1$ and $B_2$ for application B. It is noted that each application can include a number of different hierarchical concept trees depending upon the different attributes (or combinations of attributes) that may be selected when conducting a search. A common metadata model for applications A and B facilitates a search across applications, with linking of concept trees from one application with similar concept tress of another application.

The present invention embodiments are applicable to a number of scenarios including, without limitation, file systems (i.e., where clients 2 access a file server 4) and web content management systems (i.e., where clients 2 access a content management server 4), as well as applications utilizing a software plug-in component or module that provides application specific searchable attributes to two or more other applications. Thus, two or more different applications can be linked together to facilitate transfer of data based upon searches across different search domains as described above.

Figure 6:
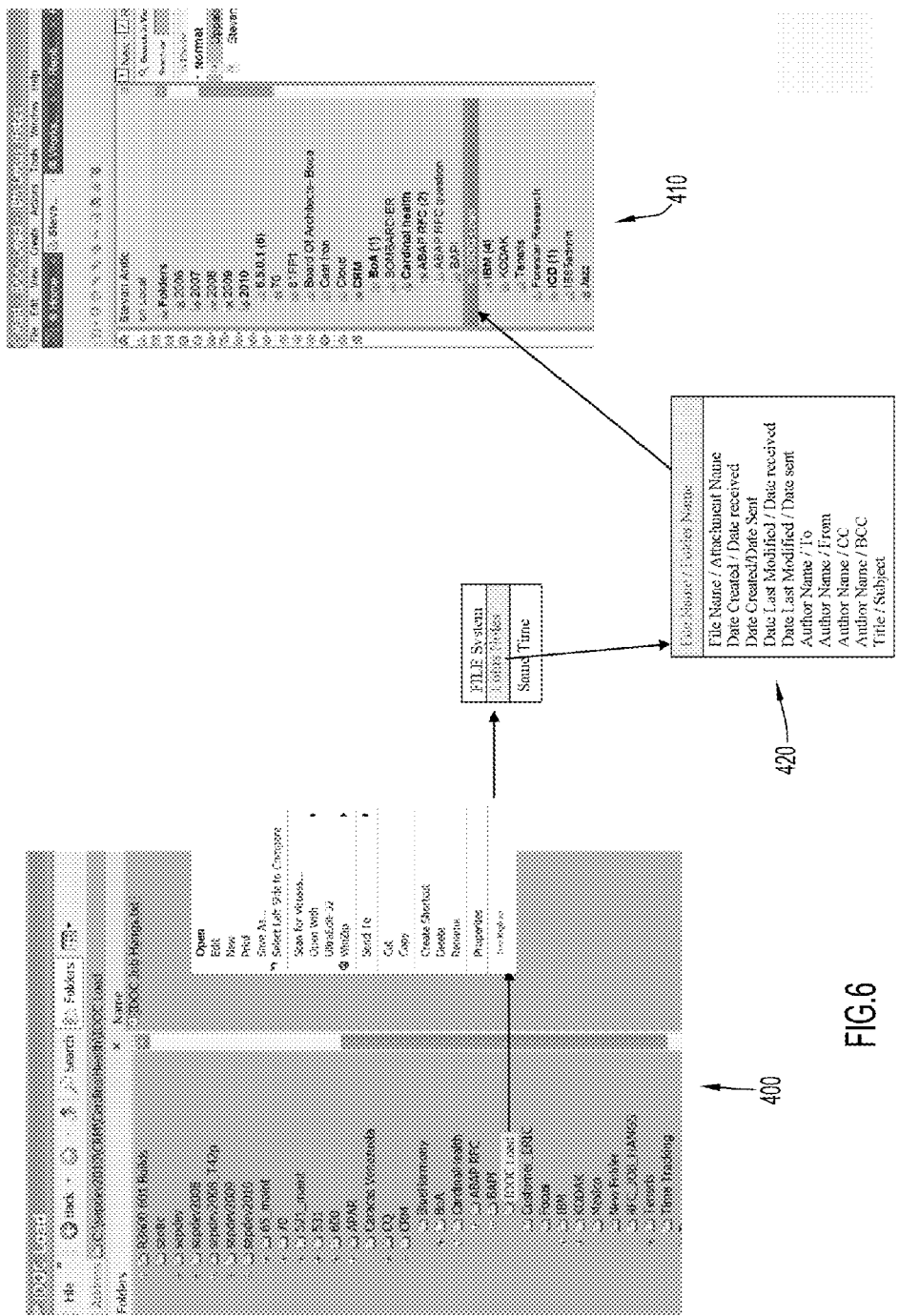
FIG. 6 depicts GUI images showing the mapping of concept trees across two applications.

An example embodiment of two concept trees being linked across two applications is depicted by the GUI images of FIG. 6. In the example embodiment, the GUI image 400 shows file system folder object attributes for an application A ("IDOC Load") being mapped to the object attributes of another application B having a GUI image 410 (e.g., Lotus Notes). A plug-in component 420 (e.g., Eclipse) can be used to provide cross application linkage between applications A and B. In FIG. 6, a user selects a file object A (the file folder with the name "IDOC Load") on the file system via GUI image 400 to initialize a search. The user can then invoke a concept tree explorer that lists all applications that support cross-domain object browsing and searching. The concept tree explorer returns a list of applications (e.g., FILE System, Lotus Notes, Same time), allowing the user to select application B (Lotus Notes). Upon selection of the application B, the plug-in component 420 returns all known attribute mapping between objects that belong to the application B (e.g., emails, email folders, Calendar, and all other Lotus notes applications) and the object for application A. In this example, the user selects mapping File name (file system folder name) to Folder Name (Lotus notes email Folder Name). Based on the selected attribute mapping, and the selected attribute value of the object for application A ("IDOC Load"), the plug-in component applies analytics to find and return an object from the application B (e.g., an email Folder name that is the best match of the file system Folder name).

In this example, a filename can be mapped, for example, to search within the content of an email or email attachments. Also, the author field of a file in the file system shown as GUI image 400 can be linked to either a sender or received field in the application 410. The plug-in component 420 includes a listing of attributes that are common to both the file system and the application. A user can select a particular attribute to search in the application in order to obtain an object of interest that is accessible with GUI image 410. For example, a file may be stored on the file system that is accessible via GUI image 400. A user may attempt to find the origin of this file by searching across domains to other applications (e.g., by selecting attributes such as file name, author, date file was created or last modified, etc. using the plug-in component 420), which would lead to obtaining a copy of the file within the application associated with GUI image 410.

Mapping of attributes in order to link concept trees between applications can be achieved automatically for certain attributes. In other cases, a user may need to manually map attributes from one application to another. For example, attributes such as the metadata for the To, CC and Bcc fields for email data files can be mapped to metadata providing author information for other types of data files (such as a word processing document). When a search is performed, the system can link to other applications using the common links between concept trees.

Thus, the present invention facilitates searching across different search domains and traversing linked concept trees between different applications to achieve search results that may not have a direct relation to the initial search results. This provides an intuitive way to find an object of interest by seeding the search with an object that is already available, and then browsing associated concept trees that link the seed object file with the searched object file.

It will be appreciated that the embodiments described above and illustrated in the drawings represent only a few of the many ways of implementing embodiments for file object browsing and searching across different domains.

The topology or environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., IBM-compatible, laptop, PDA, mobile devices, etc.), and may include any commercially available operating system and any commercially available or custom software (e.g., browser software, communications software, server software, cleansing and data quality analysis software, etc.). These systems may include any types of monitors and input devices (e.g., keyboard, mouse, voice recognition, etc.) to enter and/or view information.

It is to be understood that the software (e.g., the data mart, gap report module, rule template module, instantiated rule module, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow diagrams may be modified in any manner that accomplishes the functions described herein. In addition, the functions in the flow diagrams or description may be performed in any order that accomplishes a desired operation.

The software of the present invention embodiments may be available on a recordable medium (e.g., magnetic or optical mediums, magneto-optic mediums, floppy diskettes, CD-ROM, DVD, memory devices, etc.) for use on stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database structures may be implemented by any number of any conventional or other databases, data stores or storage structures (e.g., files, databases, data structures, data or other repositories, etc.) to store information. The databases and/or other storage structures may be remote from or local to the computer or other processing systems, and may store any desired data.

Present invention embodiments may be utilized for analyzing the data of any types (e.g., boolean, character, alphanumeric, symbols, etc.) representing any information. Further, present invention embodiments may be utilized for analyzing data from any types of storage units, systems or devices (e.g., databases, files, memory devices, data structures, processing devices, various types of stationary or mobile computer or processing systems or devices, etc.). The data analyzed from one or more data sets may be of any size, and include any type of data and metadata.

The present invention embodiments may employ any number of any type of user interface (e.g., Graphical User Interface (GUI), command-line, prompt, etc.) for obtaining or providing information (e.g., obtaining information for the desired analysis to be performed, providing charts or other data visualizations, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized for analyzing and generating visualizations of data from any data source for any type of process.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed:

1. A method of searching for a desired object stored on a computer system comprising:
   receiving, from a user, a search request for an initial search domain of a first object attribute within a first application including objects with a first set of object attributes, the search request including an initial object attribute value, wherein each object attribute in the first set of object attributes corresponds to a separate search domain;
   retrieving one or more objects from the first application based on the initial object attribute value to produce initial search results;
   selecting a first object from the initial search results based on a first indication from the user, wherein the first object is associated with a second attribute value corresponding to a second object attribute in the first set of object attributes of objects in the first application;
   listing at least one other application supporting cross-domain searching;
   receiving a second indication from the user, the second indication selecting a second application among the at least one other applications, wherein the second application includes objects with a second set of object attributes;
   listing a plurality of mappings between the first set of object attributes and the second set of object attributes;
   receiving a third indication from the user selecting a particular mapping among the plurality of mappings between the first set of object attributes and the second set of object attributes;
   initiating a subsequent search within a different search domain, the different search domain corresponding to the second object attribute; and
   retrieving one or more additional objects from the different search domain based on the second attribute value associated with the first object mapped to one of the second set of attributes according to the particular mapping selected with the third indication from the user.

2. The method of claim 1, wherein the additional objects include electronic mail.

3. The method of claim 1, wherein the additional objects include at least one of web history and website content.

4. The method of claim 1, wherein the additional objects include an image tagged with identification of subjects within the image, and the first set of object attributes includes the identification.

5. The method of claim 1, wherein a plug-in application provides a link between the first application and the at least one other application.

6. The method of claim 5,
   wherein the second indication is received through the plug-in application.

7. A system comprising:
   at least one processor configured to:
      receive, from a user, a search request for an initial search domain of a first object attribute within a first application including objects with a first set of object attributes, the search request including an initial object attribute value, wherein each object attribute in the first set of object attributes corresponds to a separate search domain;
      retrieve one or more objects from the first application based on the initial object attribute value to produce initial search results;
      select a first object from the initial search results based on a first indication from the user, wherein the first object is associated with a second attribute value corresponding to a second object attribute in the first set of object attributes of objects in the first application;
      list at least one other application supporting cross-domain searching;
      receive a second indication from the user, the second indication selecting a second application among the at least one other applications, wherein the second application includes objects with a second set of object attributes;
      list a plurality of mappings between the first set of object attributes and the second set of object attributes;
      receive a third indication from the user selecting a particular mapping among the plurality of mappings between the first set of object attributes and the second set of object attributes;
      initiate a subsequent search within a different search domain, the different search domain corresponding to the second object attribute; and
      retrieve one or more additional objects from the different search domain based on the second attribute value associated with the first object mapped to one of the second set of object attributes according to the particular mapping selected with the third indication from the user.

8. The system of claim 7, wherein the additional objects include electronic mail.

9. The system of claim 7, wherein the additional objects include at least one of web history and website content.

10. The system of claim 7, wherein the additional objects include an image tagged with identification of subjects within the image, and the first set of object attributes includes the identification.

11. The system of claim 7, wherein the at least one processor is further configured to:
    utilize a plug-in application to link the first application with at least one other application.

12. The system of claim 11, wherein the at least one processor is further configured to:

receive the second indication through the plug-in application.

13. A computer program product for searching for a desired object stored on a computer system comprising:
    a non-transitory computer readable storage medium having computer readable program code embodied therewith, the computer readable program code comprising computer readable instructions configured to:
        receive, from a user, a search request for an initial search domain of a first object attribute within a first application including objects with a first set of object attributes, the search request including an initial object attribute value, wherein each object attribute in the first set of object attributes corresponds to a separate search domain;
        retrieve one or more objects from the first application based on the initial object attribute value to produce initial search results;
        select a first object from the initial search results based on a first indication from the user, wherein the first object is associated with a second attribute value corresponding to a second object attribute in the first set of object attributes of objects in the first application;
        list at least one other application supporting cross-domain searching;
        receive a second indication from the user, the second indication selecting a second application among the at least one other applications, wherein the second application includes objects with a second set of object attributes;
        list a plurality of mappings between the first set of object attributes and the second set of object attributes;
        receive a third indication from the user selecting a particular mapping among the plurality of mappings between the first set of object attributes and the second set of object attributes;
        initiate a subsequent search within a different search domain, the different search domain corresponding to the second object attribute; and
        retrieve one or more additional objects from the different search domain based on the second attribute value associated with the first object mapped to one of the second set of object attributes according to the particular mapping selected with the third indication from the user.

14. The computer program product of claim 13, wherein the additional objects include electronic mail.

15. The computer program product of claim 13, wherein the additional objects include at least one of web history and website content.

16. The computer program product of claim 13, wherein the additional objects include an image tagged with identification of subjects within the image, and the set of object attributes includes the identification.

17. The computer program product of claim 13, wherein a plug-in application accessible via the computer readable instructions provides a link between the first application and the at least one other application.

18. The computer program product of claim 17, wherein the computer readable instructions are further configured to:
    receive the second indication through the plug-in application.

* * * * *